United States Patent [19]

Kawashima

[11] Patent Number: 5,481,376

[45] Date of Patent: Jan. 2, 1996

[54] METHOD AND APPARATUS FOR IMPROVING IMAGE QUALITY

[75] Inventor: Sumihiko Kawashima, Ohtsu, Japan

[73] Assignee: Toyo Boseki Kabushiki Kaisha, Osaka, Japan

[21] Appl. No.: 264,460

[22] Filed: Jun. 23, 1994

[30] Foreign Application Priority Data

Jun. 23, 1993 [JP] Japan ........................... 5-152072

[51] Int. Cl.$^6$ .................................................. H04N 1/40
[52] U.S. Cl. ........................................... 358/455; 358/458
[58] Field of Search ........................... ; 382/27, 54, 205, 382/237, 274; 358/462, 461; H04N 447–448, 455, 457, 458, 298, 1/40

[56] References Cited

U.S. PATENT DOCUMENTS

| | | | |
|---|---|---|---|
| 5,144,687 | 9/1992 | Honda | 358/455 |
| 5,157,740 | 10/1992 | Klein et al. | 358/462 |
| 5,285,854 | 11/1993 | Eschbach | 358/455 |

*Primary Examiner*—Edward L. Coles, Sr.
*Assistant Examiner*—Kim Yen Vu
*Attorney, Agent, or Firm*—Leydig, Voit & Mayer, Ltd.

[57] ABSTRACT

The present invention provides a method for improving the quality of an image having a plurality of pixels by enhancing the contrast of the image, including the steps of: subtracting a gray-scale level of the original image at a first pixel from a gray-scale level of the original image at a second pixel, so as to produce a difference $\Delta G$; multiplying the difference $\Delta G$ by N, so as to produce a value $\Delta GN$; and determining a gray-scale level of an image with enhanced contrast at the second pixel depending on the gray-scale level of the image with enhanced contrast at the first pixel and the value $\Delta GN$.

10 Claims, 5 Drawing Sheets

METHOD AND APPARATUS FOR IMPROVING IMAGE QUALITY

BACKGROUND OF THE INVENTION

1. Field of the Invention

The present invention relates to a method and an apparatus for improving the quality of an image by enhancing the contrast of the image.

2. Description of the Related Art

Conventional methods for improving the quality of an image by enhancing the contrast of the image include a method called "gray-scale transformation". For example, an original image, the contrast of which is to be enhanced, can include gray-scale levels in the range of a1 to a2, and a display apparatus which will display the image has the allowable gray-scale levels in the range of k1 to k2. According to conventional methods, the gray-scale range of the image of a1 to a2 is widened to the allowable range of k1 to k2, so that the contrast of the image is enhanced. The transformation for enhancing the contrast is performed by using Expression (1) below:

$$g(i, j) = \{(k2-k1) \cdot (f(i, j)-a1)/(a2-a1)\} + k1 \quad (1)$$

where f(i, j) denotes the gray-scale level of a pixel positioned in the i-th row and the j-th column of the original image, and g(i, j) denotes the gray-scale level of a pixel positioned in the i-th row and the j-th column of the image with enhanced contrast.

FIG. 5 shows the variation of gray-scale levels of an image along one scanning line. In FIG. 5, the solid line indicates the variation of gray-scale levels of an original image along the scanning line, and the one-dot chain line indicates the variation of gray-scale levels of an image which is obtained by enhancing the contrast of the original image with Expression (1), along the scanning line. In this example, it is assumed that the allowable gray-scale levels of the employed display apparatus are in the range of 0 to 255 (i.e., 0 to 255 gray-scale levels). As shown in FIG. 5, in regions A and C, the contrast of the original image is properly enhanced. As a result, the details in gray-scale variation of the original image are made clearer in regions A and C, so that a viewer can easily perceive the gray-scale variation. However, as to regions B and D, it is difficult for the viewer to perceive the details in the gray-scale variation of the original image. In regions B and D, since the gray-scale levels of the image with enhanced contrast are saturated, the information related to the details in the gray-scale variation of the original image is lost. In regions B and D, the image with enhanced contrast appears white (in the region B) or black (in the region D). Accordingly, it is impossible to realize how the original image appears.

SUMMARY OF THE INVENTION

The method of this invention for improving the quality of an image including a plurality of pixels by enhancing the contrast of the image, includes the steps of: subtracting a gray-scale level of the image at a first pixel included in the image from a gray-scale level of the image at a second pixel included in the image, so as to produce a difference ΔG; multiplying the difference ΔG by N, so as to produce a value ΔGN which is N times as large as the difference ΔG, N being larger than 1; and determining a gray-scale level of an image with enhanced contrast at the second pixel depending on the gray-scale level of the image with enhanced contrast at the first pixel and the value ΔGN, wherein the determining step includes the steps of: determining a sum of the gray-scale level of the image with enhanced contrast at the first pixel and the value ΔGN as the gray-scale level of the image with enhanced contrast at the second pixel, when the sum is in the range from a first predetermined value K1 to a second predetermined value K2, the first predetermined value K1 being larger than the second predetermined value K2; determining the first predetermined value K1 as the gray-scale level of the image with enhanced contrast at the second pixel, when the sum is larger than the first predetermined value K1; and determining the second predetermined value K2 as the gray-scale level of the image with enhanced contrast at the second pixel, when the sum is smaller than the second predetermined value K2.

According to another aspect of the invention, an apparatus for improving the quality of an image including a plurality of pixels by enhancing the contrast of the image is provided. The apparatus includes: means for subtracting a gray-scale level of the image at a first pixel included in the image from a gray-scale level of the image at a second pixel included in the image, so as to produce a difference ΔG; means for multiplying the difference ΔG by N, so as to produce a value ΔGN which is N times as large as the difference ΔG, N being larger than 1; and means for determining a gray-scale level of an image with enhanced contrast at the second pixel depending on the gray-scale level of the image with enhanced contrast at the first pixel and the value ΔGN, wherein the determining means determines: a sum of the gray-scale level of the image with enhanced contrast at the first pixel and the value ΔGN as the gray-scale level of the image with enhanced contrast at the second pixel, when the sum is in the range from a first predetermined value K1 to a second predetermined value K2, the first predetermined value K1 being larger than the second predetermined value K2; the first predetermined value K1 as the gray-scale level of the image with enhanced contrast at the second pixel, when the sum is larger than the first predetermined value K1; and the second predetermined value K2 as the gray-scale level of the image with enhanced contrast at the second pixel, when the sum is smaller than the second predetermined value K2.

In one embodiment of the invention, the first pixel and the second pixel are adjacent to each other.

Thus, the invention described herein makes possible the advantage of providing a method and an apparatus for improving the quality of an image by enhancing the contrast of the image without losing the information related to the details in gray-scale variation of the image.

This and other advantages of the present invention will become apparent to those skilled in the art upon reading and understanding the following detailed description with reference to the accompanying figures.

DESCRIPTION OF THE PREFERRED EMBODIMENTS

Hereinafter, a method for improving the quality of an image according to the invention will be described. An image M the contrast of which is to be enhanced includes a plurality of pixels. Among the pixels included in the image M, a pixel positioned in the I-th row and the J-th column is represented by P(I, J). The gray-scale level at the pixel P(I, J) of the image is represented by G(I, J). An image which is obtained by enhancing the contrast of the image M in accordance with the image-quality improving method of the invention is represented by M'. The image M' also includes a plurality of pixels. Among the pixels included in the image M', a pixel positioned in the I-th row and the J-th column is represented by P'(I, J). The gray-scale level at the pixel P'(I, J) of the image is represented by GN(I, J).

Figure 1:
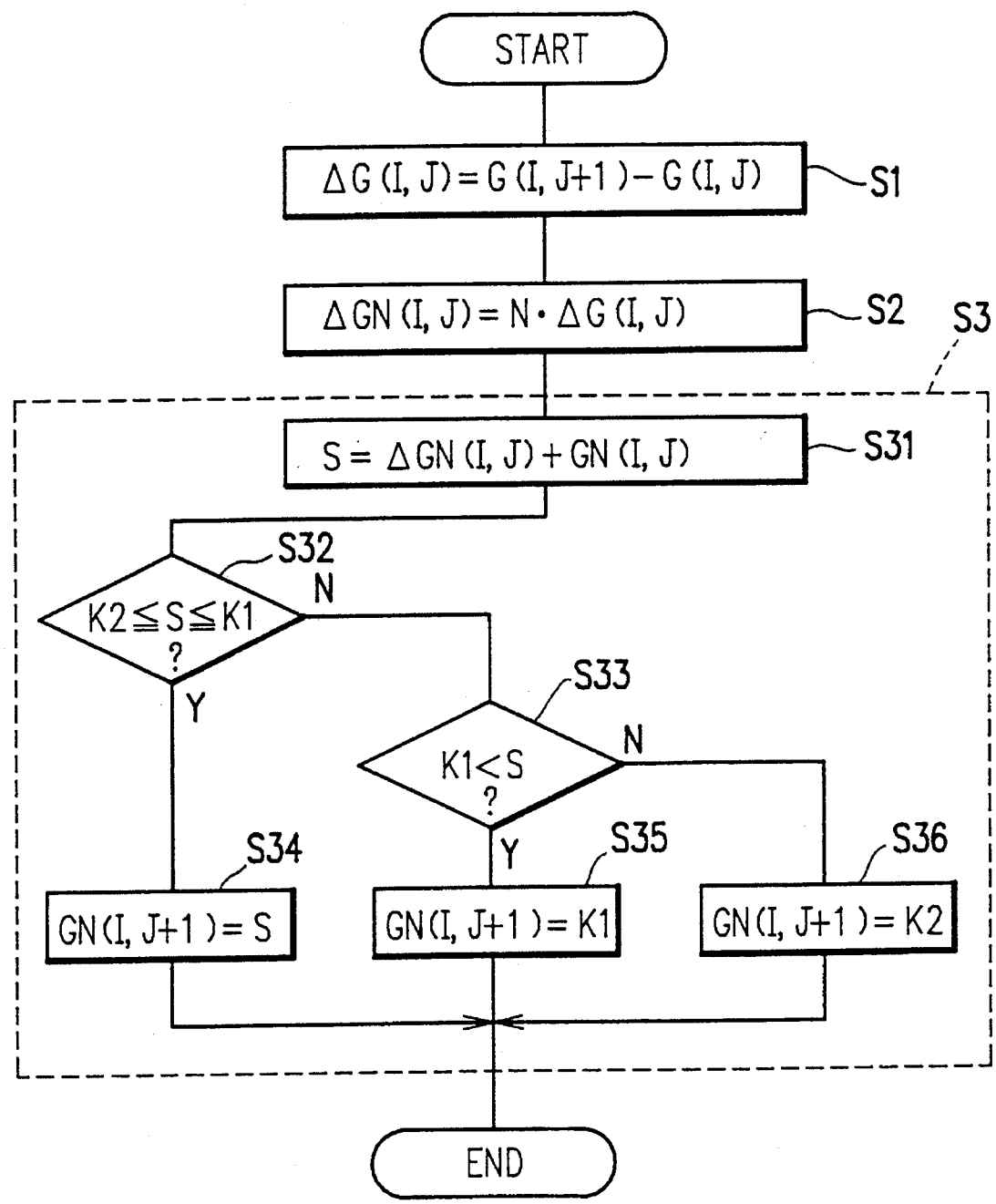
FIG. 1 shows the procedure of an image-quality improving method according to the invention.

FIG. 1 shows the procedure of the image-quality improving method according to the invention.

In step S1, the gray-scale level G(I, J) at the pixel P(I, J) is subtracted from the gray-scale level G(I, J+1) at the pixel P(I, J+1). The difference obtained by the subtraction is denoted by ΔG(I, J). Expression (2) below represents the calculation in step S1.

$$\Delta G(I, J) = G(I, J+1) - G(I, J) \quad (2)$$

In this example, the subtraction is performed for the gray-scale levels at pixels which are adjacent to each other along the scanning line direction. However, the invention is not limited by the positions of pixels for which the subtraction is performed. According to the invention, it is sufficient that the subtraction is performed for the gray-scale levels at a pixel and another pixel which is positioned away from the pixel by at least one pixel.

In step S2, the difference ΔG(I, J) is multiplied by N. A value obtained by the multiplication is denoted by ΔGN(I, J). Herein, N is an arbitrary number larger than 1. Expression (3) below represents the calculation in step S2.

$$\Delta GN(I, J) = \Delta G(I, J) \quad (3)$$

In step S3, the gray-scale level GN(I, J+1) at the pixel P'(I, J+1) of the image is obtained depending on the gray-scale level GN(I, J) at the pixel P'(I, J) of the image and the N-times difference ΔGN(I, J) calculated in step S2. More particularly, step S3 includes steps S31 to S36 as shown in FIG. 1.

In step S31, the sum of the gray-scale level GN(I, J) at the pixel P'(I, J) of the image and the N-times difference ΔGN(I, J) is calculated. The sum is denoted by S. Expression (4) below represents the calculation in step S31.

$$S = \Delta GN(I, J) + GN(I, J) \quad (4)$$

In steps S32 and S33, the relationship among the sum S, a predetermined value K1, a predetermined value K2 is determined. Herein, the predetermined values K1 and K2 are arbitrary constants which satisfy the condition of K1>K2. Preferably, the predetermined value K1 is set to be the upper limit of the allowable gray-scale range of the display apparatus, and the predetermined value K2 is set to be the lower limit of the allowable gray-scale range of the display apparatus. If the predetermined values K1 and K2 are set to be the upper and lower limits as described above, the widening ratio of the gray-scale levels of the image can be the highest.

If the sum S is neither larger than the predetermined value K1 nor smaller than the predetermined value K2, the gray-scale level GN(I, J+1) at the pixel P'(I, J+1) of the image is determined to be the sum S (step S34).

If the sum S is larger than the predetermined value K1, the gray-scale level GN(I, J+1) at the pixel P'(I, J+1) of the image is determined to be the predetermined value K1 (step S35).

If the sum S is smaller than the predetermined value K2, the gray-scale level GN(I, J+1) at the pixel P'(I, J+1) of the image is determined to be the predetermined value K2 (step S36).

Expression (5) below represents the calculation in steps S31 to S36.

$$GN(I, J+1) = \begin{cases} \Delta GN(I, J) + GN(I, J) & (5) \\ \quad (\text{when } K2 \leq S \leq K1) \\ K1 \text{ (when } K1 < S) \\ K2 \text{ (when } S < K2) \end{cases}$$

Expression (5) can be regarded as a recurrence formula with respect to J, because the (J+1)th value GN(I, J+1) is determined depending on the J-th value GN(I, J). In order to determine the value GN(I, J+1), it is necessary to give an initial value GN(I, 0) to the recurrence formula.

The initial value GN(I, 0) is obtained by defining $G_yN(I, 0)$ in accordance with Expressions (6) to (9). In other words, as shown in Expression (10), the initial value GN(I, 0) is defined to be equal to $G_yN(I, 0)$.

$$\Delta G_y(I-1, 0) = G(I, 0) - G(I-1, 0) \quad (6)$$

$$\Delta G_yN(I-1, 0) = N \cdot \Delta G_y(I-1, 0) \quad (7)$$

$$S_y = \Delta G_yN(I-1, 0) + G_yN(I-1, 0) \quad (8)$$

$$G_yN(I, 0) = \begin{cases} \Delta G_yN(I-1, 0) + G_yN(I-1, 0) & (9) \\ \quad (\text{when } K2 \leq S_y \leq K1) \\ K1 \text{ (when } K1 < S_y) \\ K2 \text{ (when } S_y < K2) \end{cases}$$

$$GN(I, 0) = G_yN(I, 0) \quad (10)$$

Expression (9) can be regarded as a recurrence formula with respect to I, because the I-th value $G_yN(I, 0)$ is determined depending on the (I−1)th value $G_yN(I-1-0)$. In order to determine the value $G_yN(I, 0)$, it is necessary to give an initial value $G_yN(0, 0)$ to the recurrence formula. The initial value $G_yN(0, 0)$ for $G_y(I, 0)$ can be determined based on G(0, 0) or can be determined arbitrarily.

After the value $G_yN(0, 0)$ is determined, the value $G_yN(I, 0)$ is determined on the basis of Expression (9). As a result, the value GN(I, 0) is determined on the basis of Expression (10). As a result, the value GN(I, J+1) is determined on the basis of Expression (5).

By repeatedly performing steps S1 to S3 for all of I and J, the image M' with enhanced contrast is obtained.

According to the conventional method, the contrast of the image is enhanced by magnifying the gray-scale levels of the image at a specific ratio. On the contrary, according to the image-quality improving method of the invention, the contrast of the image is enhanced depending on the differences in gray-scale levels of the image. Moreover, by setting the upper limit K1 and the lower limit K2 in the process using Expression (2) to Expression (5), the information related to the differences in gray-scale levels in the original image can be positively taken over to the image with enhanced contrast, irrespective of the gray-scale levels of the original image. As a result, even in a region in which the information related to the details in variation of gray-scale levels of the image was lost due to the saturation of gray-scale levels in the conventional method, the contrast of the image can be enhanced without losing the information related to the details in variation of gray-scale levels of the image.

Figure 2:
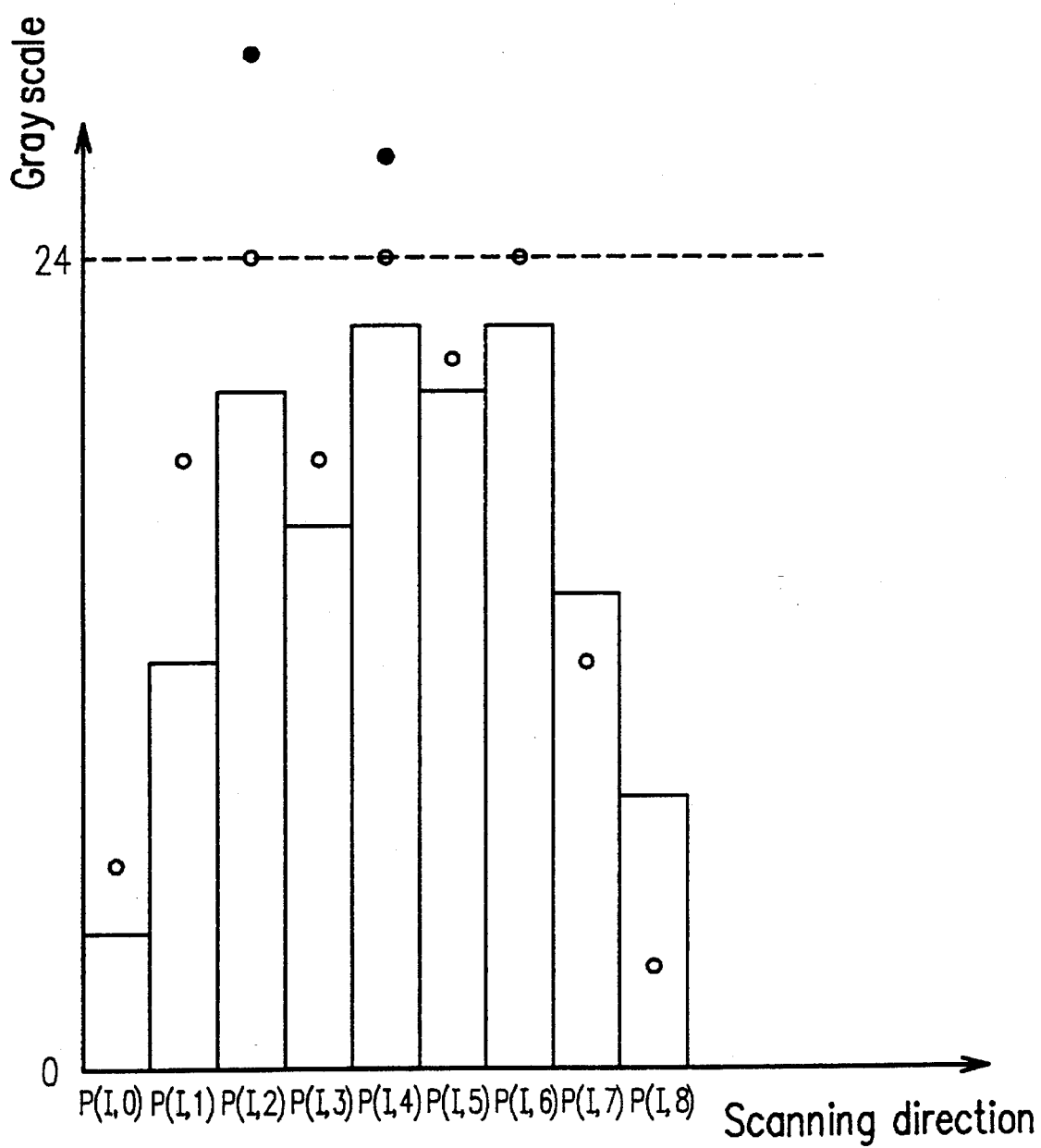
FIG. 2 shows a specific example of the image-quality improving method according to the invention.

Next, by referring to FIG. 2, enhancement of the contrast of the image in accordance with the image-quality improving method of the invention will be specifically described.

It is assumed that an original image includes pixels P(I, 0) to P(I, 8) arranged in a specific direction. In FIG. 2, the gray-scale levels G(I, 0) to G(I, 8) of the original image at respective pixels are represented by bar chart. In this example, the gray-scale levels G(I, 0) to G(I, 8) of the original image are given as follows. Herein, it is assumed that N= 1.5, K1=24, K2=0, and GN(I, 0)=6.

G(I, 0)=4

G(I, 2)=12

G(I, 3)=16

G(I, 4)=22

G(I, 5)=20

G(I, 6)=22

G(I, 7)=14

G(I, 8)=8

In FIG. 2, the gray-scale levels GN(I, 0) to GN(I, 8) of the image with enhanced contrast are indicated by "circles" for respective pixels. In this example, the gray-scale levels GN(I, 1) to GN(I, 8) of the image with enhanced contrast are calculated as follows considering the upper limit K1 on the basis of Expressions (2) to (5).

$$
\begin{aligned}
GN(I, 1) &= 1.5 \times (G(I, 1) - G(I, 0)) + GN(I, 0) \\
&= 1.5 \times (12 - 4) + 6 \\
&= 18 \\
GN(I, 2) &= 24 = K1 \\
GN(I, 3) &= 1.5 \times (G(I, 3) - G(I, 2)) + GN(I, 2) \\
&= 1.5 \times (16 - 20) + 24 \\
&= 18 \\
GN(I, 4) &= 24 = K1 \\
GN(I, 5) &= 1.5 \times (G(I, 5) - G(I, 4)) + GN(I, 4) \\
&= 1.5 \times (20 - 22) + 24 \\
&= 21 \\
GN(I, 6) &= 1.5 \times (G(I, 6) - G(I, 5)) + GN(I, 5) \\
&= 1.5 \times (22 - 20) + 21 \\
&= 24 \\
GN(I, 7) &= 1.5 \times (G(I, 7) - G(I, 6)) + GN(I, 6) \\
&= 1.5 \times (14 - 22) + 24 \\
&= 12 \\
GN(I, 8) &= 1.5 \times (G(I, 8) - G(I, 7)) + GN(I, 7) \\
&= 1.5 \times (8 - 14) + 12 \\
&= 3
\end{aligned}
$$

The most important point to be considered in the gray-scale levels GN(I, 0) to GN(I, 8) of the image with enhanced contrast is that the values GN(I, 2) and GN(I, 4) are set to be the upper limit K1. The purpose of this is to set the upper limit of the gray-scale levels of the image with enhanced contrast at a constant value (K1). As a result, the gray-scale level at the next pixel of the image with enhanced contrast is determined on the basis of the constant value (K1). Accordingly, even if the gray-scale level at one specific pixel of the image with enhanced contrast is saturated, the gray-scale level at the next pixel of the image with enhanced contrast cannot be saturated so far as the gray-scale level at the next pixel of the original image is lower than the gray-scale level at the specific pixel of the original image. As a result, it is possible to reflect the details of the variation in gray-scale levels of the original image on the image with enhanced contrast. In FIG. 2, solid circles indicate the values GN(I, 2) and GN(I, 4) in the case where the gray-scale levels of the image with enhanced contrast are determined without considering the upper limit K1.

In FIG. 2, the specific example in which the gray-scale levels of the image with enhanced contrast exceed the upper limit K1 has been described. Another specific example in which the gray-scale levels of the image with enhanced contrast lowers the lower limit K2 can be similarly described.

Figure 3:
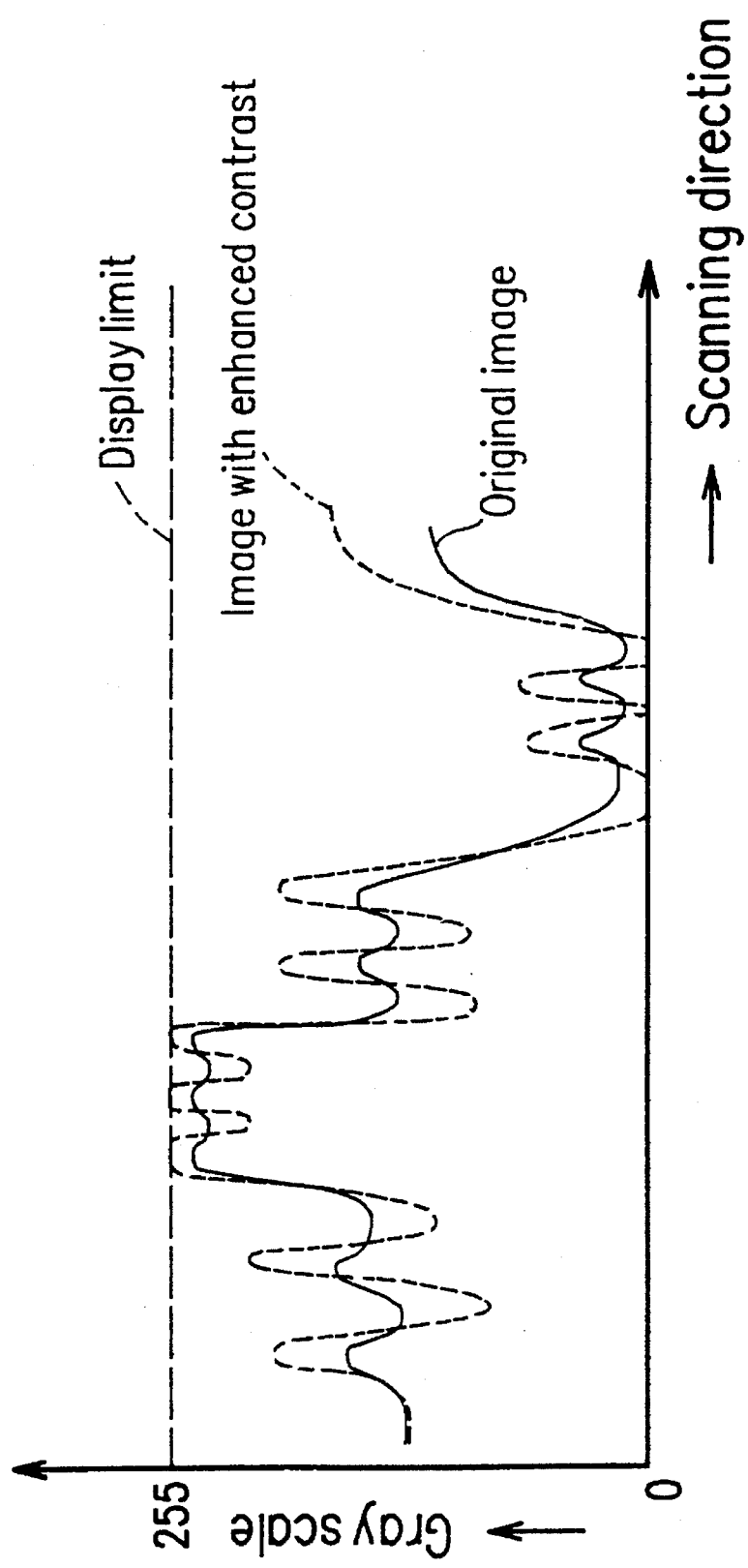
FIG. 3 shows an example of an image with enhanced contrast in accordance with the image-quality improving method of the invention.
Figure 5:
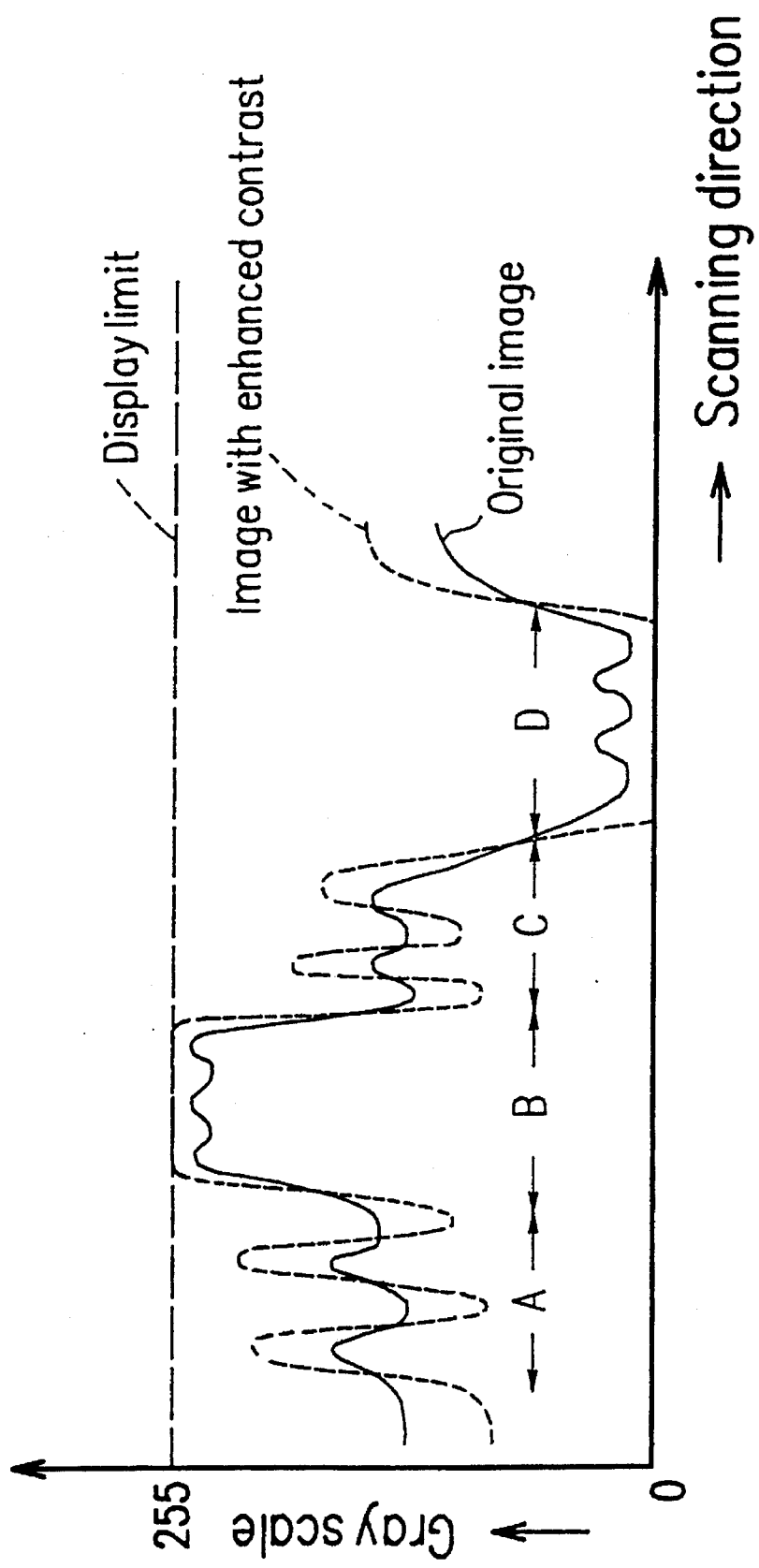
FIG. 5 shows an example of an image with enhanced contrast in accordance with a conventional image-quality improving method.

Referring to FIG. 3, the effects of the image-quality improving method according to the invention will be described. In FIG. 3, the solid line indicates the variation in gray-scale levels of the same image as the original image shown by the solid line in FIG. 5, and the one-dot chain line indicates the variation in gray-scale levels of an image obtained by enhancing the contrast of the original image in accordance with the image-quality improving method of the invention. In this example, the values K1 and K2 are set to be 255 and 0, respectively. When FIGS. 5 and 3 are compared, it is found that, even in the regions B and D in which the information related to the details of variation in gray-scale levels of the image was lost due to the gray-scale saturation in FIG. 5, the contrast can be properly enhanced without losing the information related to the details of variation in gray-scale levels of the image in FIG. 3.

As described above, according to the image-quality improving method of the invention, the contrast of an image can be enhanced without losing the information related to the details of variation in gray-scale levels of the image, irrespective of the gray-scale levels of the image. As a result, it becomes possible to make the information related to an object obscurely appearing in the background clearer. For example, if the invention is applied to images such as X-ray image for medical purpose, a defective portion can easily be specified because unclear portions of the image can be made clearer.

The application range of the invention is not limited to a colorless image. When the invention is applied to respective R, G, and B components of a color image, the contrast of the color image can be enhanced.

Figure 4:
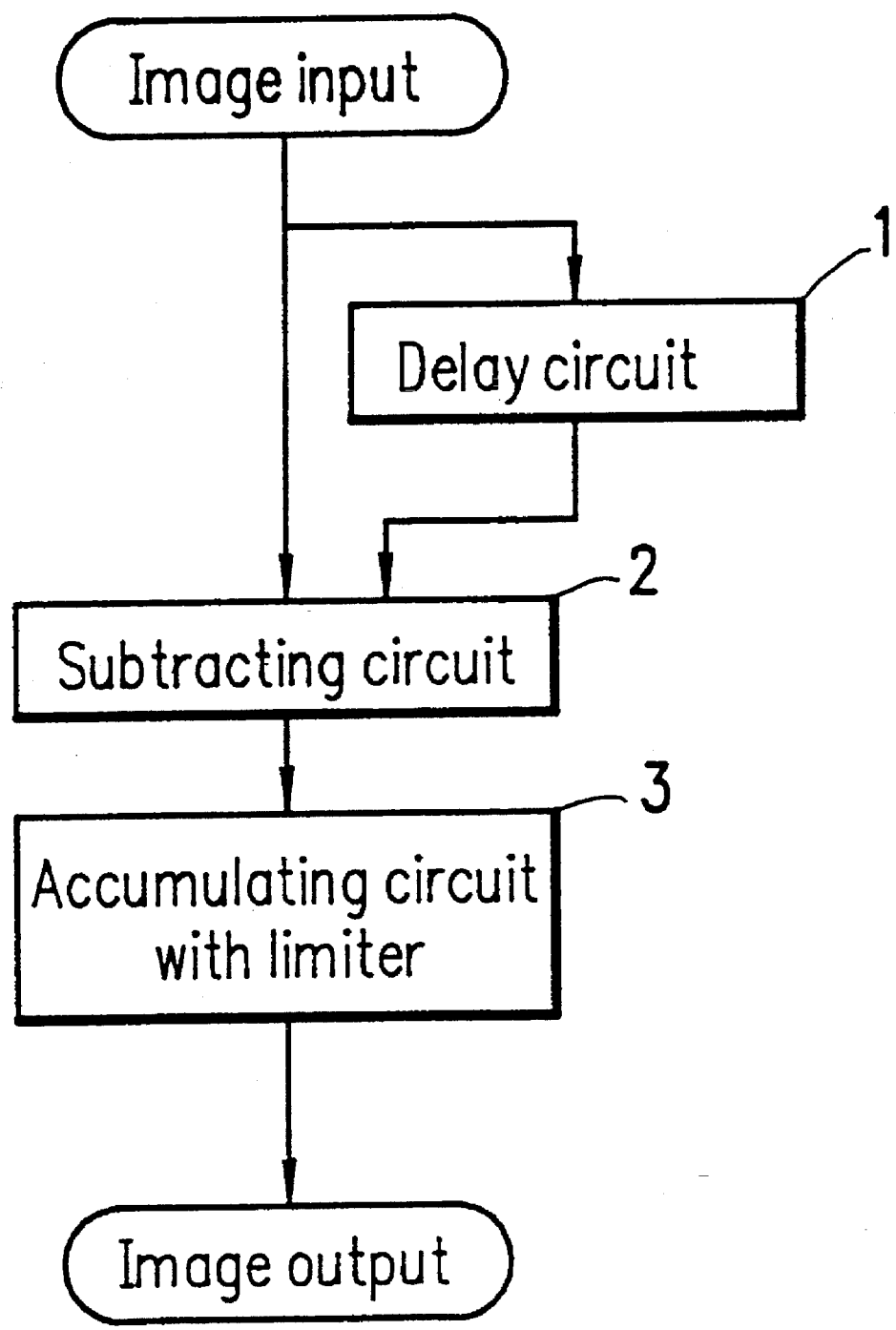
FIG. 4 shows the construction of an exemplary image-quality improving apparatus according to the invention.

FIG. 4 shows the construction of an exemplary image-quality improving apparatus according to the invention. The image-quality improving apparatus executes the process shown in FIG. 1. The image-quality improving apparatus includes a delay circuit 1, a subtracting circuit 2, and an accumulating circuit 3 with limiters.

To the delay circuit 1 and the subtracting circuit 2, an image signal is input from an imaging device such as a CCD camera. The image signal indicates the gray-scale level at one pixel included in an image. The delay circuit 1 holds the input image signal during a predetermined period of time, so as to delay the input image signal by a predetermined number of pixels. The subtracting circuit 2 receives the image signal from the imaging device and the delayed image signal from the delay circuit 1, and calculates the difference between the two image signals. Then, the subtracting circuit 2 outputs a signal indicating a value which is N times as large as the difference to the accumulating circuit 3 with limiters. In other words, the subtracting circuit 2 performs the process defined by Expressions (2) and (3). Thus, in the subtracting circuit 2, the difference in gray scale of the image is enhanced. The accumulating circuit 3 with limiters performs the accumulation considering the upper and lower limits K1 and K2. In other words, the accumulating circuit 3 with limiters performs the process defined by Expression (5). As a result, an image, the contrast of which is enhanced in accordance with the image-quality improving method of the invention, can be obtained.

The image-quality improving apparatus of this example can output a vivid and clear image with enhanced contrast, while it has a simple circuit configuration as shown in FIG. 4.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for improving the quality of an image including a plurality of pixels by enhancing the contrast of the image, comprising the steps of:

outputting from an electrical imaging device a first electrical signal having image information therein, the image information including pixel and gray-scale level information;

receiving the electrical signal from the electrical imaging device;

selecting a first pixel and a first gray-scale level at the first pixel from the image information;

selecting a second pixel and a second gray-scale level at the second pixel from the image information;

subtracting the gray-scale level of the image at the first pixel from the gray-scale level of the image at the second pixel, so as to produce a difference $\Delta G$;

multiplying the differences $\Delta G$ by N, so as to produce a value $\Delta GN$ which is N times as large as the difference $\Delta G$, N being larger than 1;

determining a gray-scale level of an image with enhanced contrast at the second pixel depending on the gray-scale level of the image with enhanced contrast at the first pixel and the value $\Delta GN$, wherein the determining step comprises the steps of:

determining a sum of the gray-scale level of the image with enhanced contrast at the first pixel and the value $\Delta GN$ as the gray-scale level of the image with enhanced contrast at the second pixel, when the sum is in the range from a first predetermined value K1 to a second predetermined value K2, the first predetermined value K1 being larger than the second predetermined value K2;

determining the first predetermined value K1 as the gray-scale level of the image with enhanced contrast at the second pixel, when the sum is larger than the first predetermined value K1; and determining the second predetermined value K2 as the gray-scale level of the image with enhanced contrast at the second pixel, when the sum is smaller than the second predetermined value K2; and displaying a second signal having the enhanced contrast image information therein.

2. A method according to claim 1, wherein the first pixel and the second pixel are adjacent to each other.

3. A method according to claim 1, wherein the step of selecting the second pixel from the received image information includes the step of delaying the received image signal such that the second pixel selected is a predetermined number of pixels after the first pixel selected.

4. A method according to claim 1, wherein the image information is X-ray image information.

5. An apparatus for improving the quality of an image including a plurality of pixels by enhancing the contrast of the image, comprising:

an electrical imaging device for outputting a first electrical signal having image information therein, the image information including pixel and gray-scale level information;

means for receiving the electrical signal from the electrical imaging device;

means for selecting a first pixel and a first gray-scale level at the first pixel from the image information;

means for selecting a second pixel and a second gray-scale level at the second pixel from the image information;

means for subtracting the gray-scale level of the image at the first pixel from the gray-scale level of the image at the second pixel, so as to produce a difference $\Delta G$;

means for multiplying the difference $\Delta G$ by N, so as to produce a value $\Delta GN$ which is N times as large as the difference $\Delta G$, N being larger than 1;

means for determining a gray-scale level of an image with enhanced contrast at the second pixel depending on the gray-scale level of the image with enhanced contrast at the first pixel and the value $\Delta GN$, wherein the determining means determines:

a sum of the gray-scale level of the image with enhanced contrast at the first pixel and the value $\Delta GN$ as the gray-scale level of the image with enhanced contrast at the second pixel, when the sum is in the range from a first predetermined value K1 to a second predetermined value K2, the first predetermined value K1 being larger than the second predetermined value K2;

the first predetermined value K1 as the gray-scale level of the image with enhanced contrast at the second pixel, when the sum is larger than the first predetermined value K1; and the second predetermined value K2 as the gray-scale level of the image with enhanced contrast at the second pixel, when the sum is smaller than the second predetermined value K2; and means for displaying a second signal having the enhanced contrast information therein.

6. An apparatus according to claim 5, wherein the first pixel and the second pixel are adjacent to each other.

7. An apparatus according to claim 5, wherein the means for selecting the second pixel includes a delay circuit for delaying the received image signal such that the second pixel selected is a predetermined number of pixels after the first pixel selected.

8. An apparatus according to claim 5, wherein the image information is X-ray image information.

9. An apparatus according to claim 5, wherein the electrical imaging device comprises a CCD camera.

10. An apparatus according to claim 5, wherein the electrical imaging device comprises a source of X-ray image information.

* * * * *